United States Patent
Gai et al.

(10) Patent No.: US 12,530,760 B2
(45) Date of Patent: Jan. 20, 2026

(54) DEFECT DETECTION METHOD AND APPARATUS, AND ELECTRONIC DEVICE

(71) Applicant: GOERTEK INC., Shandong (CN)

(72) Inventors: Zengyuan Gai, Shandong (CN); Xiaoyu Chi, Shandong (CN)

(73) Assignee: GOERTEK INC., Shandong (CN)

( * ) Notice: Subject to any disclaimer, the term of this patent is extended or adjusted under 35 U.S.C. 154(b) by 354 days.

(21) Appl. No.: 18/547,911

(22) PCT Filed: Jun. 24, 2021

(86) PCT No.: PCT/CN2021/102053
§ 371 (c)(1),
(2) Date: Aug. 25, 2023

(87) PCT Pub. No.: WO2022/179012
PCT Pub. Date: Sep. 1, 2022

(65) Prior Publication Data
US 2024/0296537 A1    Sep. 5, 2024

(30) Foreign Application Priority Data
Feb. 25, 2021   (CN) .......................... 202110210770.9

(51) Int. Cl.
*G06T 7/00*    (2017.01)
*G06T 7/11*    (2017.01)

(52) U.S. Cl.
CPC .......... *G06T 7/0002* (2013.01); *G06T 7/0004* (2013.01); *G06T 7/11* (2017.01)

(58) Field of Classification Search
CPC ....... G06T 7/0002; G06T 7/0004; G06T 7/62; G06T 7/64; G06T 7/90;

(Continued)

(56) References Cited

U.S. PATENT DOCUMENTS 6,888,957 B1    5/2005 Kim et al.
7,171,036 B1 *  1/2007 Liu ...................... G06T 7/0006
                                                    382/168

(Continued)

FOREIGN PATENT DOCUMENTS

CN    103218961 A    7/2013
CN    106093073 A    11/2016

(Continued)

OTHER PUBLICATIONS

Sanding Luo, et al., Projection Analysis And Algorithm Research On Workpiece Surface Defect Inspection, Computer Engineering and Applications, School of Information Science and Engineering, Ventral South University, 2015, pp. 150-153.

(Continued)

*Primary Examiner* — Katrina R Fujita
(74) *Attorney, Agent, or Firm* — Ingrassia Fisher & Lorenz, LLP

(57) ABSTRACT

A defect detection method and apparatus and an electronic device are disclosed. The method comprises: acquiring an image of an object to be detected (S1100); acquiring brightness information of pixels in the image (S1200); and acquiring appearance defect information of the object to be detected based on the brightness information (S1300), wherein the appearance defect information represents defects existing in an appearance of the object to be detected. This method enables the electronic device to quickly and accurately obtain the appearance defect information of the object to be detected, thereby saving human labor and improving the user experience.

14 Claims, 7 Drawing Sheets

(58) Field of Classification Search
CPC . G06T 2207/10004; G06T 2207/10024; G06T 2207/30108; G06T 2207/30164
See application file for complete search history.

(56) References Cited

U.S. PATENT DOCUMENTS

| | | | | |
|---|---|---|---|---|
| 7,242,801 | B1 * | 7/2007 | Wallack | G06T 5/10 |
| | | | | 382/173 |
| 7,885,453 | B1 * | 2/2011 | Wallack | G06T 7/0004 |
| | | | | 382/145 |
| 8,165,382 | B2 * | 4/2012 | Bartsch | G01N 21/958 |
| | | | | 356/600 |
| 11,151,712 | B2 * | 10/2021 | Liu | G06T 5/77 |
| 2006/0282221 | A1 * | 12/2006 | Shah | G06V 20/69 |
| | | | | 382/128 |
| 2008/0144917 | A1 * | 6/2008 | Liu | G06T 7/0006 |
| | | | | 382/141 |
| 2010/0232677 | A1 * | 9/2010 | Bartsch | G01N 21/958 |
| | | | | 382/141 |
| 2012/0310575 | A1 * | 12/2012 | Cheng | G09G 3/006 |
| | | | | 702/81 |
| 2016/0377553 | A1 | 12/2016 | Terasawa et al. | |

FOREIGN PATENT DOCUMENTS

| | | |
|---|---|---|
| CN | 106292180 A | 1/2017 |
| CN | 106782251 A | 5/2017 |
| CN | 107316287 A | 11/2017 |
| CN | 107918216 A | 4/2018 |
| CN | 108109136 A | 6/2018 |
| CN | 108230321 A | 6/2018 |
| CN | 108280822 A | 7/2018 |
| CN | 108364291 A | 8/2018 |
| CN | 109119009 A | 1/2019 |
| CN | 09544506 A | 3/2019 |
| CN | 110335273 A | 10/2019 |
| CN | 110619368 A | 12/2019 |
| CN | 110956619 A | 4/2020 |
| CN | 111721302 A | 9/2020 |
| CN | 112330598 A | 2/2021 |
| CN | 112862800 A | 5/2021 |
| JP | 2006266750 A | 10/2006 |
| JP | 6394514 B2 * | 9/2018 |

OTHER PUBLICATIONS

Zhaung Yuping, Visual Image Detection Algorithm and System for Surface Defect of Can Lids, Thesis, Hunan University, Apr. 2018.

* cited by examiner

DEFECT DETECTION METHOD AND APPARATUS, AND ELECTRONIC DEVICE

CROSS-REFERENCE TO RELATED APPLICATIONS

This Application is a U.S. National-Stage entry under 35 U.S.C. § 371 based on International Application No. PCT/CN2021/102053, filed Jun. 24, 2021 which was published under PCT Article 21(2) and which claims priority to Chinese Application No. 202110210770.9, filed Feb. 25, 20211, which are all hereby incorporated herein in their entirety by reference.

TECHNICAL FIELD

This application pertains to the field of computer technology, and more specifically, to a defect detection method and apparatus and an electronic device.

BACKGROUND

Among acoustic components, the plastic dome is an important component for making sound in electronic devices such as headphones, mobile phones, etc. The quality of the plastic dome directly determines the quality of the device.

The plastic dome generally has the following defect: too rough outer surface, small pits, slight bends, slight fracture marks, etc. In practice, due to the difficulty in defining the above defects, it is generally necessary to manually detect the defects of plastic domes, which is time-consuming and labor-intensive.

The problems in the defect detection of objects to be detected are explained above by taking the plastic dome as an example. In practice, the defect detection of other objects to be detected, such as plastic casings of electronic devices or other objects made of metal materials, also have these problems. Therefore, it is necessary to provide a defect detection method to solve these problems. In addition, other objects, desirable features and characteristics will become apparent from the subsequent summary and detailed description, and the appended claims, taken in conjunction with the accompanying drawings and this background.

SUMMARY

An object of the present disclosure is to provide anew technical solution for defect detection.

According to the first aspect of the present disclosure, a defect detection method is provided, which comprises the steps of:
acquiring an image of an object to be detected;
acquiring brightness information of pixels in the image; and
acquiring appearance defect information of the object to be detected based on the brightness information, wherein the appearance defect information represents defects existing in an appearance of the object to be detected.

Optionally, the step of acquiring appearance defect information of the object to be detected based on the brightness information comprises the steps of:
splitting the image along a vertical direction to obtain multiple sub-images;
acquiring first brightness information corresponding to a first sub-image based on the brightness information, wherein the first sub-image is any one of the multiple sub-images;
based on the first brightness information, performing brightness vertical integration projection processing on pixels in the first sub-image to obtain a first vertical integration projection curve corresponding to the first sub-image;
obtaining first fracture mark information according to the first vertical integral projection curve, wherein the first fracture mark information includes position information of a fracture mark existing in a first region, and the first region is a region corresponding to the first sub-image in the appearance of the object to be detected; and
obtaining the appearance defect information based on the first fracture mark information.

Optionally, the step of obtaining first fracture mark information according to the first vertical integral projection curve comprises the steps of:
performing first-order derivative processing on the first vertical integration projection curve to obtain a first target curve;
splitting the first target curve at a preset interval to obtain multiple sub-target curves;
acquiring multiple numerical pairs corresponding to the multiple sub-target curves one by one, wherein the numerical pair is composed of minimum and maximum values on a corresponding sub-target curve; and
obtaining the first fracture mark information based on the multiple numerical pairs.

Optionally, the step of obtaining the first fracture mark information based on the multiple numerical pairs comprises the steps of:
acquiring a first numerical pair, wherein the first numerical pair is any one of the multiple numerical pairs;
acquiring a first minimum value and a first maximum value in the first numerical pair; and
when the first minimum value is less than a first preset threshold and the first maximum value is greater than a second preset threshold, taking position information of the first numerical pair in a corresponding region of the object to be detected as the first fracture mark information.

Optionally, the step of acquiring appearance defect information of the object to be detected based on the brightness information comprises the steps of:
based on the brightness information, using a first preset local threshold segmentation algorithm to obtain a first bright spot region set and a first dark spot region set in the image, wherein the first bright spot region set includes at least one bright spot region, and the first dark spot region set includes at least one dark spot region;
obtaining multiple region pairs according to the first bright spot region set and the first dark spot region set, wherein the region pair is composed of any bright spot region in the first bright spot region set and any dark spot region in the first dark spot region set;
obtaining pit information in the appearance of the object to be detected according to the multiple region pairs, wherein the pit information includes position information of a pit existing in the appearance of the object to be detected; and
obtaining the appearance defect information based on the pit information.

Optionally, the step of obtaining pit information in the appearance of the object to be detected according to the multiple region pairs comprises the steps of:

calculating a distance between the bright spot region and the dark spot region included in each region pair of the multiple region pairs;

selecting the region pairs with a corresponding distance less than a preset distance threshold from the multiple region pairs to obtain multiple region pairs to be determined;

calculating a mean brightness difference between the bright spot region and the dark spot region included in each region pair of the multiple region pairs to be determined;

obtaining a target region pair based on the mean brightness difference; and obtaining the pit information based on the target region pair.

Optionally, before performing the step of obtaining multiple region pairs according to the first bright spot region set and the first dark spot region set, the method further comprises the steps of filtering out bright spot regions having an area less than or equal to the first preset area threshold from the first bright spot region set; and filtering out dark spot regions having an area less than or equal to a second preset area threshold from the first dark spot region set.

Optionally, the step of acquiring appearance defect information of the object to be detected based on the brightness information comprises the steps of:

splitting the image along a horizontal direction to obtain multiple sub-images;

obtaining a mean brightness value curve based on the brightness information and the multiple sub-images, wherein the mean brightness value curve includes multiple mean brightness value points, and the mean brightness value point represents a mean brightness value of pixels in a corresponding sub-image;

performing discrete derivative processing on the mean brightness value curve to obtain minimum and maximum values of discrete derivatives; and when the minimum value is greater than a third preset threshold and the maximum value is less than a fourth preset threshold, obtaining bending region information based on the mean brightness value point corresponding to the minimum value and the maximum value, wherein the bending region information includes the position information of the bending region in the appearance of the object to be detected.

According to a second aspect of the present disclosure, a defect detection apparatus is provided, which comprises:

an image acquisition module for acquiring an image of an object to be detected;

a brightness information acquisition module for acquiring brightness information of pixels in the image; and an appearance defect information acquisition module for acquiring appearance defect information of the object to be detected based on the brightness information, wherein the appearance defect information represents defects existing in an appearance of the object to be detected.

According to a third aspect of the present disclosure, an electronic device is also provided, which comprises the devices as described in the second aspect of the present disclosure. Alternatively, the electronic device comprises:

a memory for storing executable instructions; and a processor for, according to the instructions, controlling the electronic device to perform the method described in the first aspect of the present disclosure.

A beneficial effect of the present disclosure is that, according to the embodiments of the present disclosure, when the electronic device detects defects of the object to be detected, such as a plastic dome, it can quickly and accurately obtain the appearance defect information of the object to be detected by obtaining an image of the object to be detected and then obtaining the brightness information of pixels in the image.

Other features and advantages of the present disclosure will become clearer by reading the following detailed description of the exemplary embodiments of the present disclosure with reference to the accompanying drawings.

BRIEF DESCRIPTION OF DRAWINGS

The present invention will hereinafter be described in conjunction with the following drawing figures, wherein like numerals denote like elements, and.

DETAILED DESCRIPTION

Figure 1:
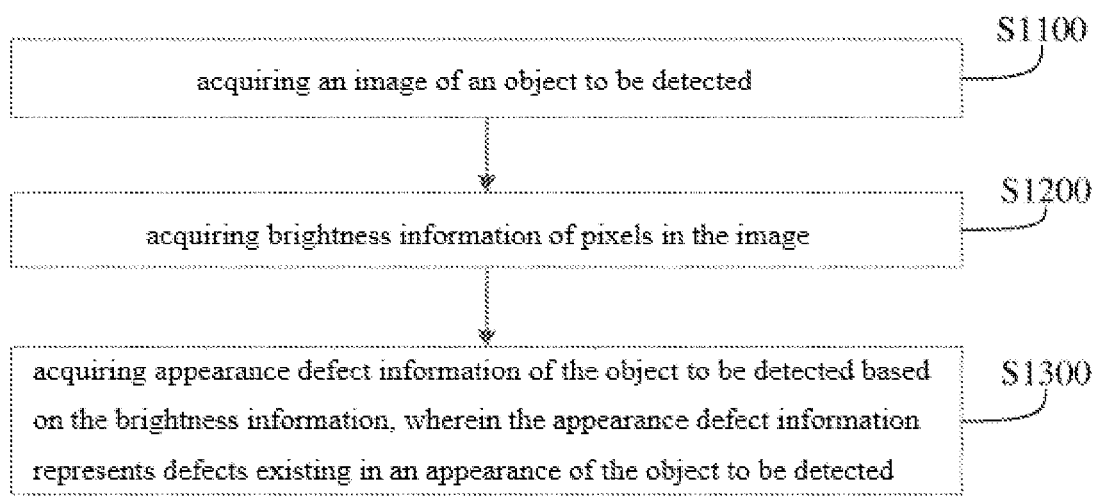
FIG. 1 is a schematic flowchart of a defect detection method according to an embodiment of the present disclosure.

The following detailed description is merely exemplary in nature and is not intended to limit the invention or the application and uses of the invention. Furthermore, there is no intention to be bound by any theory presented in the preceding background of the invention or the following detailed description.

Now, various exemplary embodiments of the present disclosure will be described in detail with reference to the accompanying drawings. It should be noted that, unless specified otherwise, the arrangements of the members and steps, mathematical formulas and numerical values described in these embodiments do not restrict the scope of the present disclosure.

The following description of at least one exemplary embodiment is in fact only illustrative, and in no way serves as any restriction on the present disclosure and its application or use.

The techniques, methods and equipment known to a person of ordinary skill in the art may not be discussed in detail. However, when applicable, these techniques, methods and equipment shall be considered as a part of the specification.

In all the examples shown and discussed herein, any specific value should be interpreted as merely illustrative and not as a limitation. Therefore, other examples of the exemplary embodiments may have different values.

It should be noted that similar reference numerals and letters denote similar items in the following drawings. Therefore, once an item is defined in one drawing, it does not need to be further discussed in the subsequent drawings.

Method Embodiment

FIG. 1 is a schematic flowchart of a defect detection method according to an embodiment of the present disclosure. The method can be implemented by an electronic device, such as a server. Of course, in specific implementation, the electronic device may also be a terminal device, such as a mobile phone, tablet computer, etc., which is not specifically limited here.

According to FIG. 1, the method of this embodiment may comprise the following steps S1100-S1300, which will be explained in detail below.

Step S1100, acquiring an image of an object to be detected;

The object to be detected refers to a physical object having defects on the appearance, i.e., the external surface to be detected. In this embodiment, unless otherwise specified, it is described by taking the plastic dome as an example. Of course, in specific implementation, the physical object may also be other objects, such as plastic casings of electronic devices, or objects made of metal materials, which is not specifically limited here.

In specific implementation, the image of the object to be detected may be obtained by shooting the object using an image collection device, such as a camera, by the user, and after obtaining the image, the user may send, by using the terminal device of the user, the image to the electronic device implementing the defect detection method of this embodiment, such as a server.

Step S1200, acquiring brightness information of pixels in the image;

In the field of image processing, the common color models for describing pixel colors in images include HSB (hue, saturation, brightness), RGB (red, green, blue), CMYK (cyan, magenta, yellow, black), CIE L*a*b*, etc. Among them, in the HSB color model, H represents hue, S represents saturation, and B represents brightness; in the RGB color model, R represents red, G represents green, and B represents blue. In this embodiment, the brightness information of pixels represents the relative brightness of pixels in the image, and its value is usually obtained by performing color space transformation on the RGB values of pixels in the image. Namely, the brightness data of pixels can be obtained by multiplying the RGB values of pixels in the image with a corresponding parameter matrix. The parameter matrix may be a 3*3 matrix of YCbCr. YCbCr is a type of color space that is usually used for continuous image processing in movies or in digital photography systems, Y refers to the brightness component, Cb refers to the blue chromaticity component, and Cr refers to the red chromaticity component. In addition, if the image is a grayscale image, the brightness of the pixel generally refers to its grayscale value. The higher the grayscale value, the higher the brightness of the pixel.

In this embodiment, unless otherwise specified, the brightness of the pixel is represented as follows: the image of the object to be detected is a grayscale image, and the brightness information of the pixel is the grayscale value. The grayscale value refers to the color depth of the pixel in the black and white image, and its value range is generally [0-255]. For example, white is 255, and black is 0. As the detailed processing for acquiring the brightness value of an image belongs to the prior art, it will not be repeated here.

Step S1300, acquiring appearance defect information of the object to be detected based on the brightness information, wherein the appearance defect information represents defects existing in an appearance of the object to be detected.

In an embodiment, the step of acquiring the appearance defect information of the object to be detected based on the brightness information comprises: obtaining a mean brightness value of all pixels in the image based on the brightness information; when the mean brightness value is greater than a first brightness threshold or less than a second brightness threshold, it is determined that the appearance defect information of the image represents the presence of serious appearance defects.

Figure 2A:
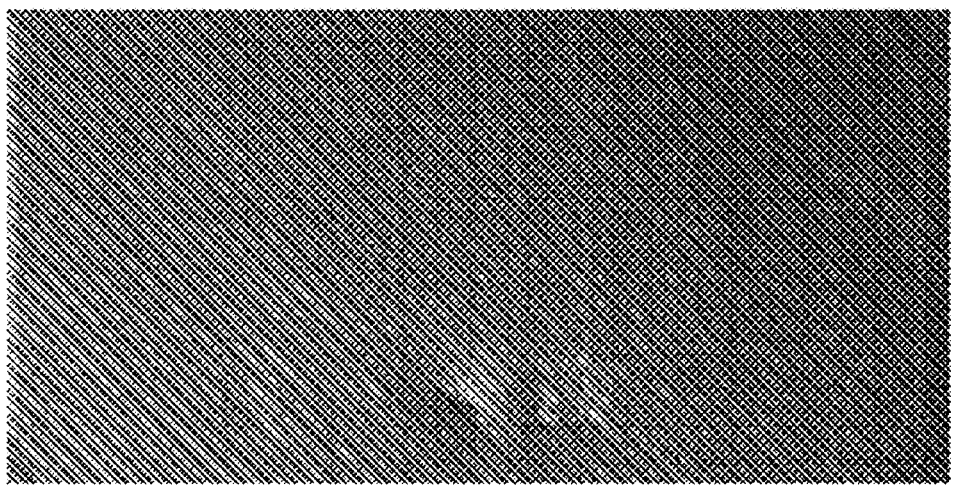
FIG. 2a is an image of a plastic dome with severe appearance defects according to an embodiment of the present disclosure.
Figure 2B:
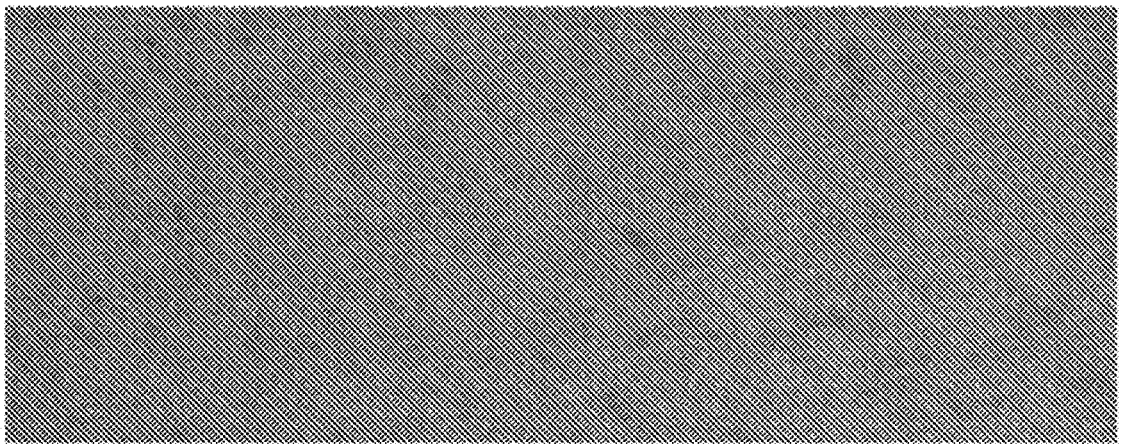
FIG. 2b is an image of a plastic dome with a normal appearance according to an embodiment of the present disclosure.

Please refer to FIGS. 2a and 2b, which are an image of a plastic dome with serious appearance defects provided in this embodiment and an image of a plastic dome with a normal appearance. As shown in FIG. 2a, when the appearance of the object to be detected is normal, the brightness of the image is close to normal and relatively uniform as a whole. As shown in the box of FIG. 2b, since the plastic dome has an uneven thickness and multiple pits, the overall brightness of the image is relatively bright. Therefore, based on the mean brightness value of all pixels in the image, it can be determined that the plastic dome has serious appearance defects.

It should be noted that, in specific implementation, the above processing may be performed first to determine whether there are serious appearance defects in the image to be detected. If yes, there is no need to perform subsequent processing.

In specific implementation, when there are not serious appearance defects in the image to be detected, different detection processes may be performed as needed to detect different types of appearance defects of the object to be detected. In this embodiment, the appearance defects of the object to be detected may be at least one of the following: fracture marks, large rough regions, pits, and bends. It will be first explained below how to detect fracture marks in the appearance of the object to be detected.

Figure 3:
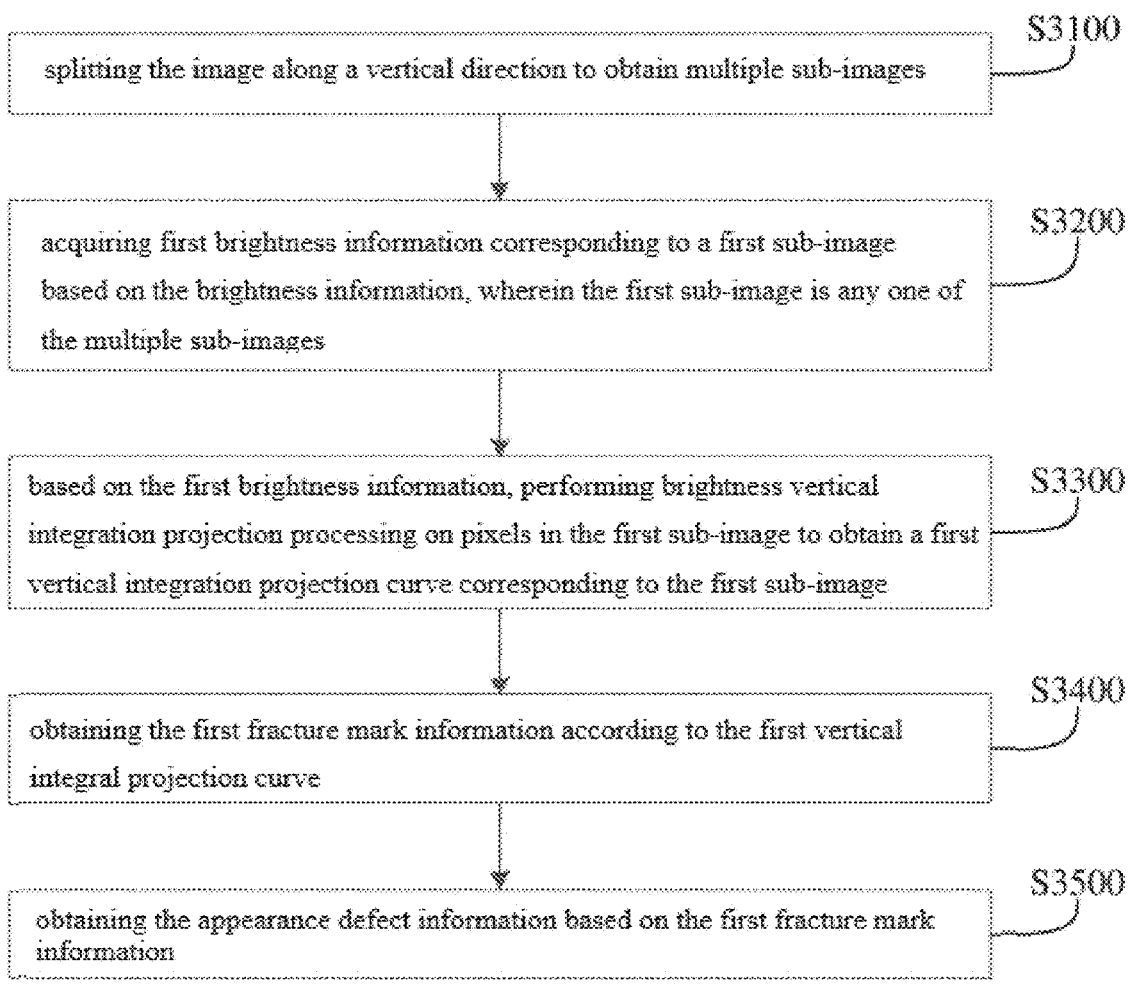
FIG. 3 is a schematic diagram of a process for acquiring fracture mark information according to an embodiment of the present disclosure.

Please refer to FIG. 3, which is a schematic diagram of the process for acquiring fracture mark information according to an embodiment of the present disclosure. As shown in FIG. 3, in this embodiment, the step of acquiring appearance defect information of the object to be detected based on the brightness information may comprise the following steps S3100-S3500.

Figure 4:
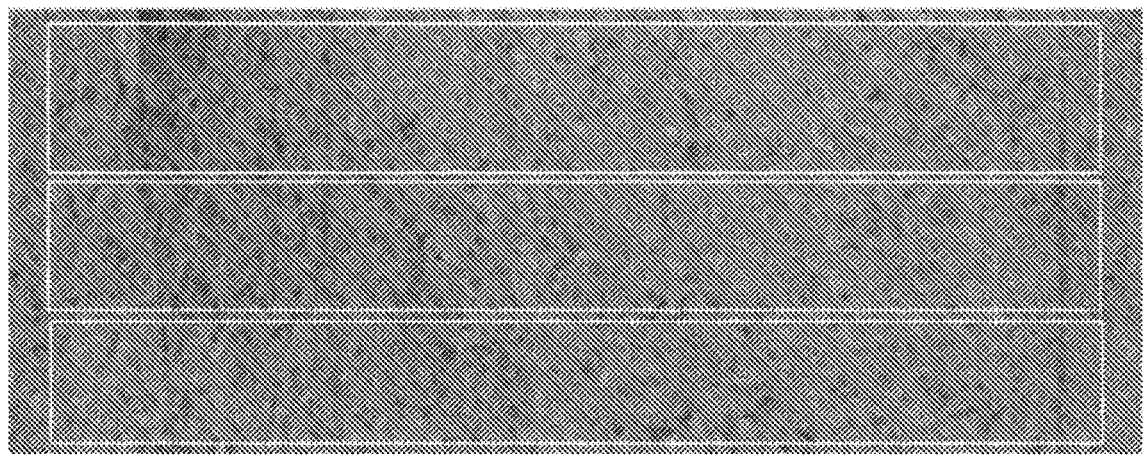
FIG. 4 is a schematic diagram of a first image splitting according to an embodiment of the present disclosure.

Step S3100, splitting the image along a vertical direction to obtain multiple sub-images;

In specific implementation, in order to improve detection speed and accuracy, the image of the object to be detected may be split along the vertical direction into a preset number of sub-images. As shown in FIG. 4, the image of the target to be detected may be evenly split into a preset number of sub-images along the vertical direction. For example, it may be split into three sub-images. It should be noted that, in specific implementation, other methods (such as unevenly splitting) may also be used to split the image, which is not specifically limited here.

Step S3200, acquiring first brightness information corresponding to a first sub-image based on the brightness information, wherein the first sub-image is any one of the multiple sub-images;

After splitting the image of the object to be detected into a preset number of sub-images, it may be detected, with respect to each sub-image, whether there is any fracture mark in the region corresponding to the sub-image in the appearance of the object to be detected, and then, by summarizing the corresponding fracture mark information of all sub-images, the appearance defect information of the object to be detected can be obtained.

In specific implementation, after obtaining the brightness information of pixels in the image, the first brightness information of the first sub-image can be obtained based on the brightness information of the pixels contained in the first sub-image, the detailed processing of which will not be repeated here.

Step S3300, based on the first brightness information, performing brightness vertical integration projection processing on pixels in the first sub-image to obtain a first vertical integration projection curve corresponding to the first sub-image;

In this embodiment, the vertical integration projection processing performed on the pixels in the first sub-image may be, for example, with respect to the pixels in the first sub-image, the brightness values, i.e. the grayscale values, of all pixels in the same column are added together.

Figure 5A:
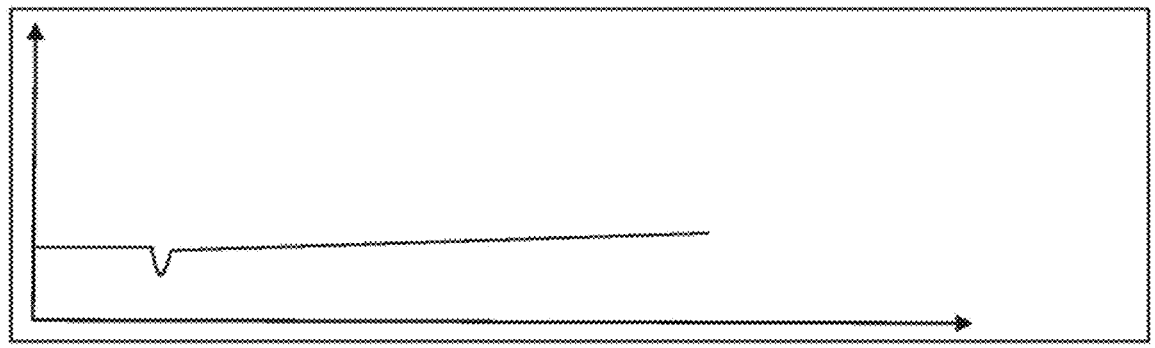
FIG. 5a is a schematic diagram of a vertical integration projection curve according to an embodiment of the present disclosure.

Please refer to FIG. 5a, which is a schematic diagram of a vertical integration projection curve according to an embodiment of the present disclosure. As shown in FIG. 5a, when there is a fracture mark in the appearance of the object to be detected, the brightness value of the pixels in that region will be significantly lower than the surrounding pixels. Therefore, the corresponding convex part in the vertical integral projection curve represents the presence of fracture mark in the corresponding region of the image to be detected.

Step S3400, obtaining first fracture mark information according to the first vertical integral projection curve, wherein the first fracture mark information includes position information of a fracture mark existing in a first region, and the first region is a region corresponding to the first sub-image in the appearance of the object to be detected;

In specific implementation, the first fracture mark information is obtained based on the first vertical integration projection curve comprises: performing first-order derivative processing on the first vertical integration projection curve to obtain a first target curve; splitting the first target curve at a preset interval to obtain multiple sub-target curves; acquiring multiple numerical pairs corresponding to the multiple sub-target curves one by one, wherein the numerical pair is composed of minimum and maximum values on a corresponding sub-target curve; and obtaining the first fracture mark information based on the multiple numerical pairs.

The step of obtaining the first fracture mark information based on the multiple numerical pairs comprises the steps of: acquiring a first numerical pair, wherein the first numerical pair is any one of the multiple numerical pairs; acquiring a first minimum value and a first maximum value in the first numerical pair; and when the first minimum value is less than a first preset threshold and the first maximum value is greater than a second preset threshold, taking position information of the first numerical pair in a corresponding region of the object to be detected as the first fracture mark information.

It should be noted that after the first vertical integral projection curve is obtained, filtering, for example, Gaussian filtering, may be performed first on the curve to make the curve as smooth as possible, the detailed processing of which will not be repeated here.

Figure 5B:
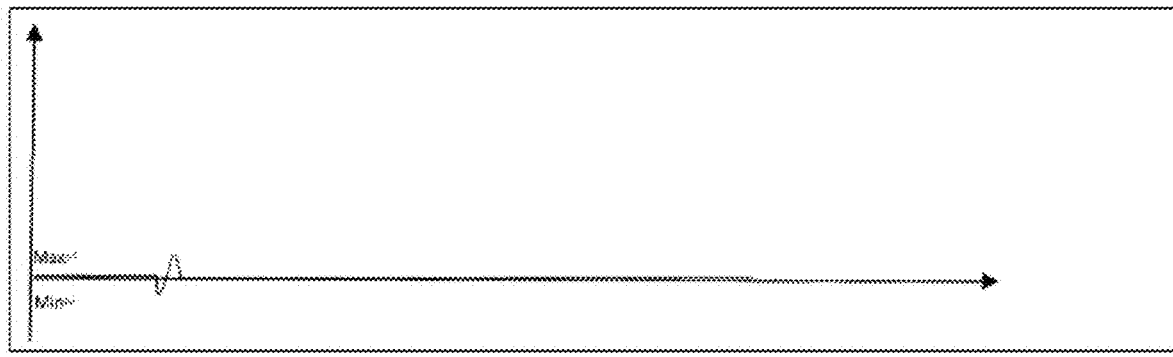
FIG. 5b is a schematic diagram of a target curve according to an embodiment of the present disclosure.

The first target curve is obtained by performing derivative processing on the first vertical integration projection curve. Please refer to FIG. 5b, which is a schematic diagram of a target curve according to an embodiment of the present disclosure, when there is a fracture mark on the appearance of the object to be detected, usually there will be corresponding maximum and minimum values on the target curve. Therefore, after obtaining the target curve, a data pair composed of local minimum and maximum values on the target curve can be obtained, and based on this data pair, the position information of the fracture mark existing in the appearance of the object to be detected can be obtained.

Step S3500, obtaining the appearance defect information based on the first fracture mark information.

After obtaining the first fracture mark information corresponding to the first sub-image by the above processing, the fracture mark information corresponding to other sub-images may be continued to acquire, and by summarizing all the first fracture mark information, information about the fracture marks existing in the appearance of the object to be detected can be obtained.

The above provides a detailed explanation on how to detect a fracture mark in the appearance of the object to be detected. It will be explained below how to detect a pit in the appearance of the object to be detected.

In practice, the corresponding region of a pit in the image is usually composed of a dark spot region and a bright spot region. Therefore, the pit in the appearance of the object to be detected can be detected by acquiring the dark and bright spot regions in the image of the object to be detected.

Figure 6:
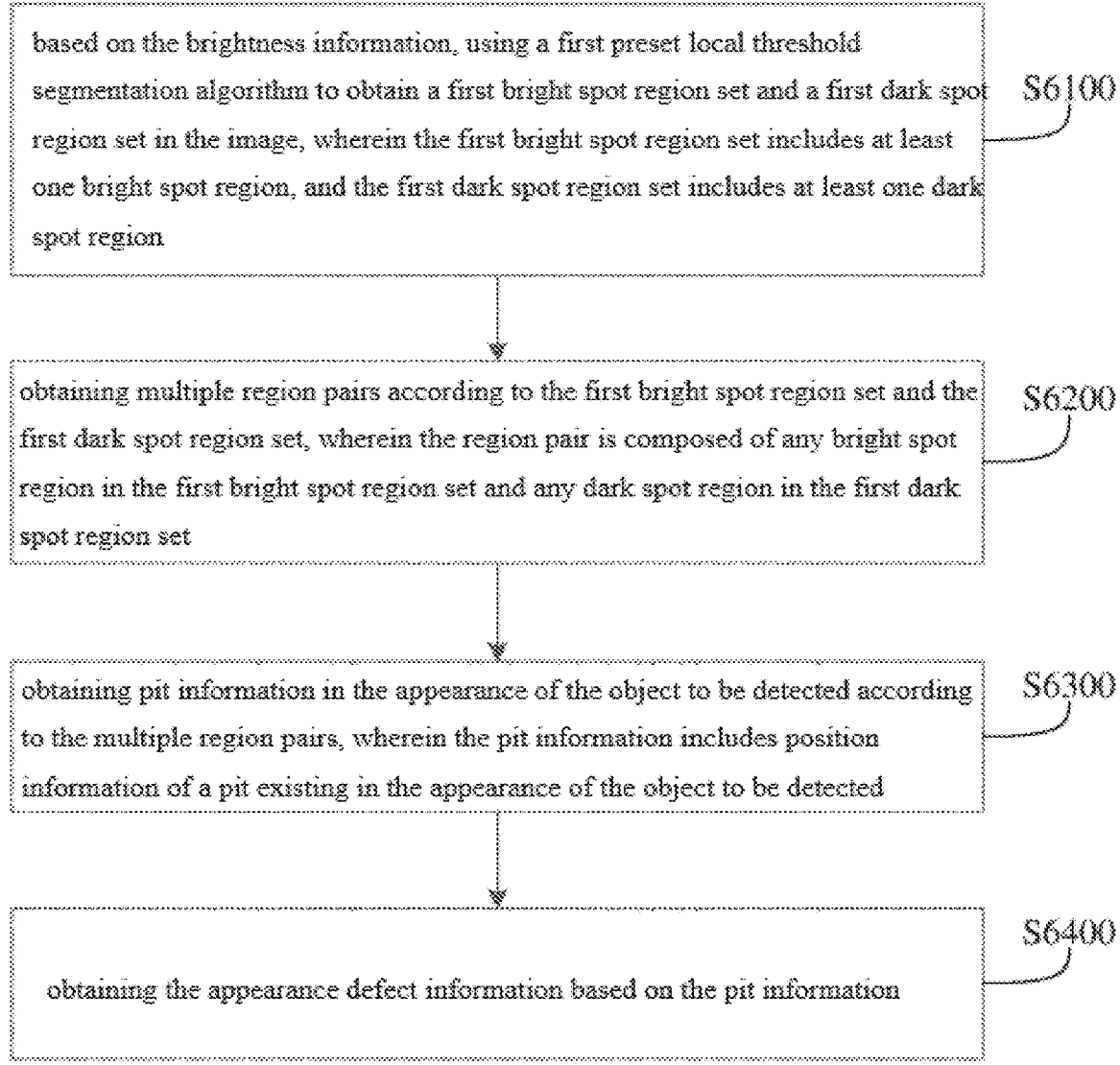
FIG. 6 is a schematic diagram of a process for acquiring pit information according to an embodiment of the present disclosure.

Please refer to FIG. 6, which is a schematic diagram of the process for acquiring pit information according to an embodiment of the present disclosure. As shown in FIG. 6, the step of acquiring appearance defect information of the object to be detected based on the brightness information comprises the following steps S6001-S6005.

Step S6001, based on the brightness information, using a first preset local threshold segmentation algorithm to obtain a first bright spot region set and a first dark spot region set in the image, wherein the first bright spot region set includes at least one bright spot region, and the first dark spot region set includes at least one dark spot region;

In this embodiment, the first preset local threshold segmentation algorithm may be as follows. First, the image of the object to be detected is split into several sub-images of a first preset size, and the first preset size may be, for example, 300 pixels*500 pixels. The mean value and variance of brightness of pixels in each sub-image are calculated. Based on the mean value and variance, the first and second local brightness thresholds corresponding to the sub-image are calculated, and the bright and dark spot regions in the sub-image are acquired based on the first and second local brightness thresholds. The bright spot region may be composed of pixels in the sub-image whose brightness is greater than the first local brightness threshold. The dark spot region may be composed of pixels in the sub-image whose brightness is less than the first local brightness threshold. Then, by summarizing the bright and dark spot regions in each sub-image, the first bright spot region set and the first dark spot region set can be obtained. It should be noted that, in practice, based on the continuity of pixel points, the same sub-image may include multiple bright spot regions and multiple dark spot regions.

In this embodiment, the first local brightness threshold may be mean+scale*std, and the second local brightness threshold may be: mean−scale*std, where "mean" represents the mean value of brightness of pixels in the corresponding sub-image, "std" represents the variance of pixel brightness in the corresponding sub-image, "scale" is a preset coefficient and its value can be set according to specific circumstances.

Step S6002, obtaining multiple region pairs according to the first bright spot region set and the first dark spot region set, wherein the region pair is composed of any bright spot region in the first bright spot region set and any dark spot region in the first dark spot region set;

After obtaining the first bright spot region set and the first dark spot region set, in order to improve accuracy, the area of each bright spot region and the area of each dark spot region may be obtained so as to filter out regions with smaller areas. Namely, before performing the step S6002, the method further comprises the steps of: filtering out bright spot regions having an area less than or equal to the first preset area threshold from the first bright spot region set; and filtering out dark spot regions having an area less than or equal to a second preset area threshold from the first dark spot region set.

Step S6003, obtaining pit information in the appearance of the object to be detected according to the multiple region pairs, wherein the pit information includes position information of a pit existing in the appearance of the object to be detected;

Step S6004, obtaining the appearance defect information based on the pit information.

In specific implementation, the step of obtaining pit information in the appearance of the object to be detected according to the multiple region pairs comprises the steps of calculating a distance between the bright spot region and the dark spot region included in each region pair of the multiple region pairs; selecting the region pairs with a corresponding distance less than a preset distance threshold from the multiple region pairs to obtain multiple region pairs to be determined; calculating a mean brightness difference between the bright spot region and the dark spot region included in each region pair of the multiple region pairs to be determined; obtaining a target region pair based on the mean brightness difference; and obtaining the pit information based on the target region pair.

In practice, the dark spot region and the bright spot region that make up the pit are usually close to each other. Therefore, in order to avoid interference caused by other regions, the distance of each region pair in multiple region pairs may be acquired separately, and based on this distance, the distance pairs whose corresponding distance is less than a preset distance threshold are filtered out. This distance may be obtained by separately acquiring the center points of the dark spot region and the bright spot region, and calculating the distance between the two center points.

Further, in order to avoid the influence of rough appearance of the object to be detected, the mean brightness difference between the bright spot region and the dark spot region in the region pairs after filtered as stated above (i.e., the region pairs to be determined) may be calculated separately, and the region pairs to be determined whose mean brightness difference is relatively large (for example, greater than a preset threshold) are taken as the target region pairs. Then, based on the target region pairs, the position information of the pit existing in the appearance of the object to be detected can be obtained.

Figure 7A:
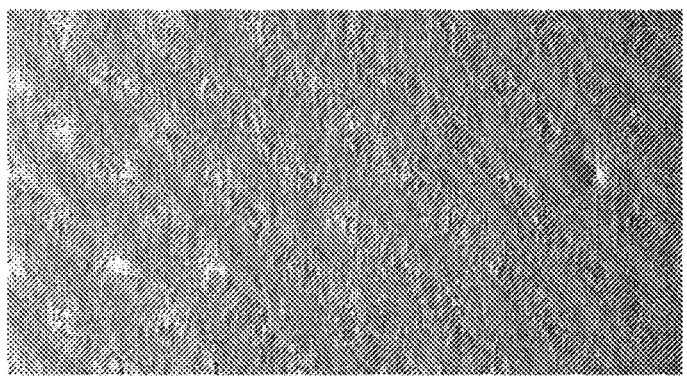
FIG. 7a is a schematic diagram of a pit according to an embodiment of the present disclosure.
Figure 7B:
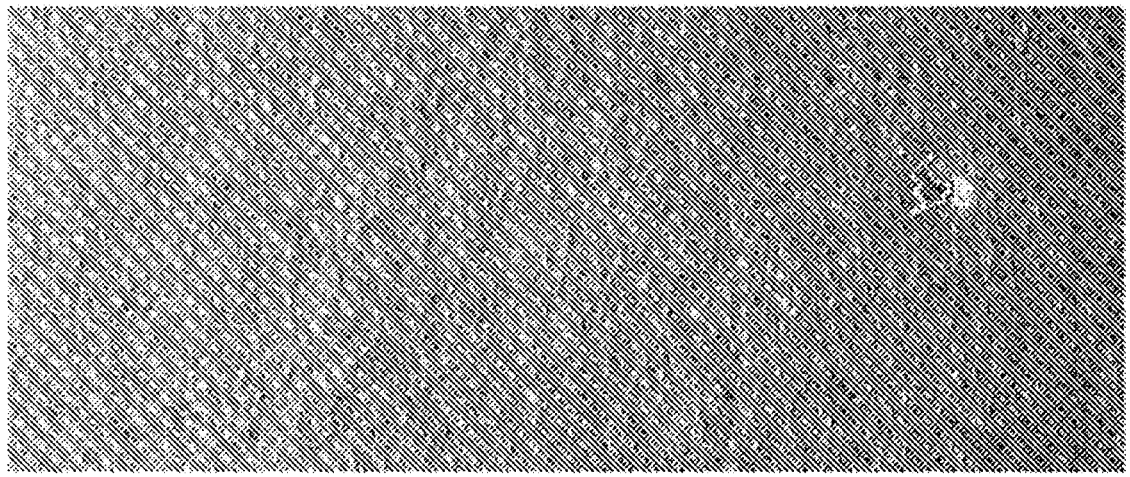
FIG. 7b is a schematic diagram of identifying a pit region according to an embodiment of the present disclosure.

Please refer to FIGS. 7a and 7b, which are a schematic diagram of the pit provided in this embodiment and a schematic diagram identifying the pit region, respectively. According to FIGS. 7a and 7b, it can be seen that the method according to this embodiment can accurately detect the pit information in the appearance of the object to be detected.

The above provides a detailed explanation of how to detect a pit in the appearance of the object to be detected. It should be noted that, in specific implementation, the processing similar to the above may also be used to detect the defect of large rough region in the appearance of the object to be detected. Specifically, the processing may comprise: based on the brightness information, using a second preset local threshold segmentation algorithm to obtain a second bright spot region set and a second dark spot region set in the image, wherein the second bright spot region set includes at least one bright spot region, and the second dark spot region set includes at least one dark spot region; obtaining the appearance defect information based on the second bright spot region set and the second dark spot region set.

It should be noted that, the bright spot regions in the second bright spot region set and the dark spot regions in the second dark spot region set may be much larger than the bright spot regions in the first bright spot region set and the dark spot regions in the second dark spot region set, that is, they are many white or dark defect regions in the appearance of the object to be detected.

The second preset local threshold segmentation algorithm may be as follows. The image of the object to be detected is evenly split into two sub-images. For example, the image is evenly split into left and right sub-images. The mean value of brightness of pixels in each sub-image is calculated. Based on the mean value, the third and fourth local brightness thresholds corresponding to the sub-image are calculated, and the bright and dark spot regions in the sub-image are acquired based on the third and fourth local brightness thresholds. The bright spot region may be composed of pixels in the sub-image whose brightness is greater than the third local brightness threshold. The dark spot region may be composed of pixels in the sub-image whose brightness is less than the fourth local brightness threshold. Then, by summarizing the bright and dark spot regions in each sub-image, the second bright spot region set and the second dark spot region set can be obtained. It should be noted that, in practice, based on the continuity of pixel points, the same sub-image may include multiple bright spot regions and multiple dark spot regions, which is not specifically limited here.

In this embodiment, the third local brightness threshold may be mean*(1+scale1), and the fourth local brightness threshold may be: mean*scale2, where "mean" represents the mean value of brightness of pixels in the corresponding sub-image, and "scale1" and "scale2" are preset coefficients and their values can be set according to specific circumstances.

Figure 8A:
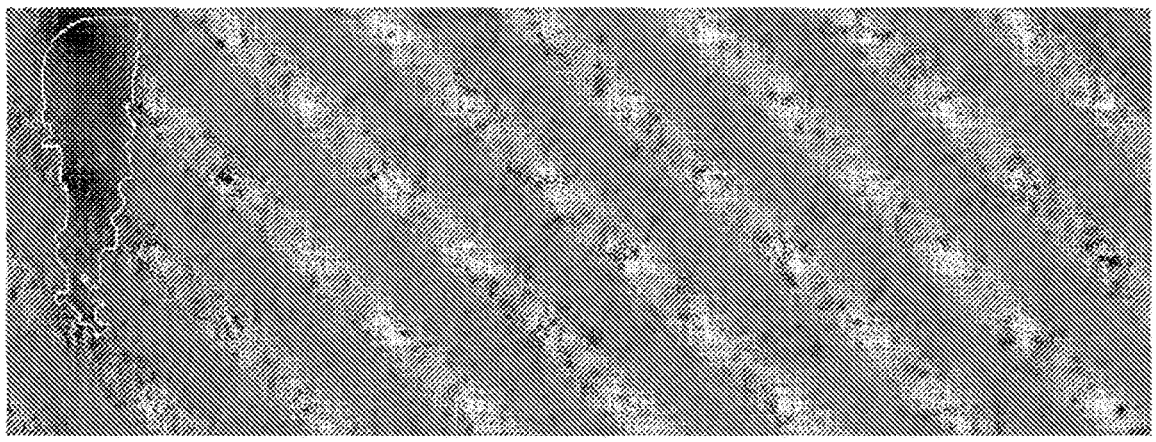
FIG. 8a is a schematic diagram of a locally darkened region according to an embodiment of the present disclosure.
Figure 8B:
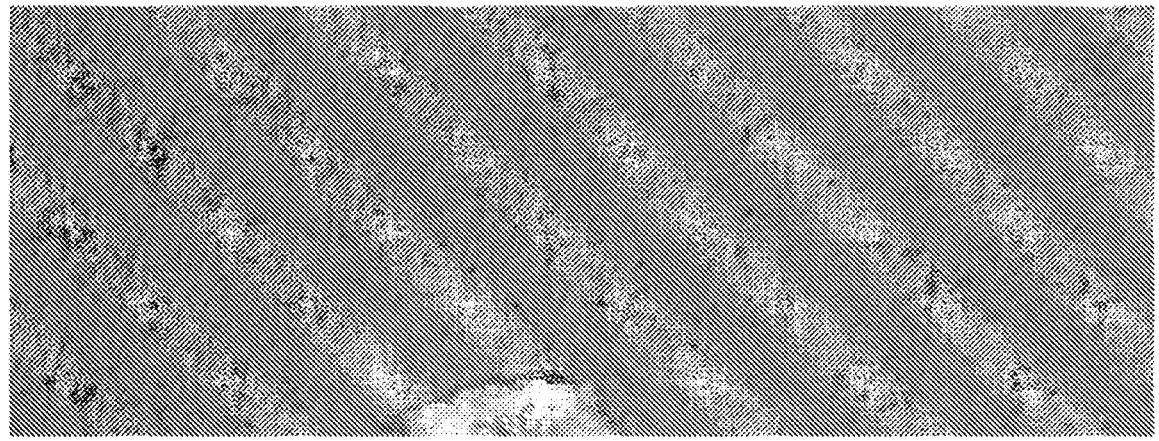
FIG. 8b is a schematic diagram of a locally brightened region according to an embodiment of the present disclosure.

Please refer to FIGS. 8a and 8b, which are schematic diagrams of a locally darkened region and a locally brightened region according to an embodiment of the present disclosure, respectively. According to FIGS. 8a and 8b, it can be seen that in the embodiment of the present disclosure, the above method can quickly and accurately obtain a large rough region existing in the appearance of the object to be detected.

In an embodiment, the step of acquiring appearance defect information of the object to be detected based on the brightness information comprises the steps of: splitting the image along a horizontal direction to obtain multiple sub-images; obtaining a mean brightness value curve based on the brightness information and the multiple sub-images, wherein the mean brightness value curve includes multiple mean brightness value points, and the mean brightness value point represents a mean brightness value of pixels in a corresponding sub-image; performing discrete derivative processing on the mean brightness value curve to obtain minimum and maximum values of discrete derivatives; and when the minimum value is greater than a third preset threshold and the maximum value is less than a fourth preset threshold, obtaining bending region information based on the mean brightness value point corresponding to the minimum value and the maximum value, wherein the bending region information includes the position information of the bending region in the appearance of the object to be detected.

Namely, when collecting an image of the object to be detected, the object to be detected is tilted along the horizontal direction, and then the pixel brightness in the image will change uniformly along the horizontal direction. Therefore, when there is a bend (such as a slight bend rather than a fracture) in the appearance of the object to be detected, the brightness change will be more significant.

Figure 9A:
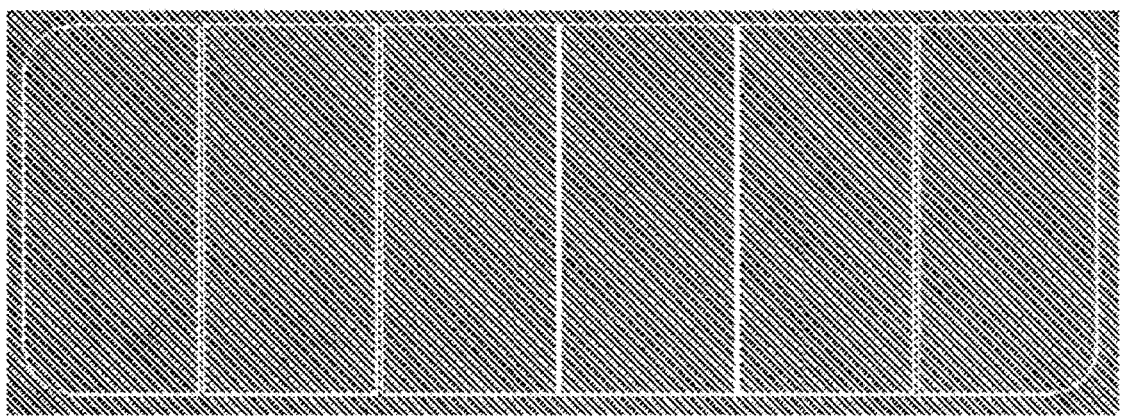
FIG. 9a is a schematic diagram of a second image splitting according to an embodiment of the present disclosure.

Please refer to FIG. 9a, which is a schematic diagram of the second image splitting according to an embodiment of the present disclosure. Namely, with respect to the image of the object to be detected, it may be split along the horizontal direction to obtain multiple sub-images. It has been proved by experiments that when the image is evenly split into 6 sub-images, the detection results obtained are more accurate.

Figure 9B:
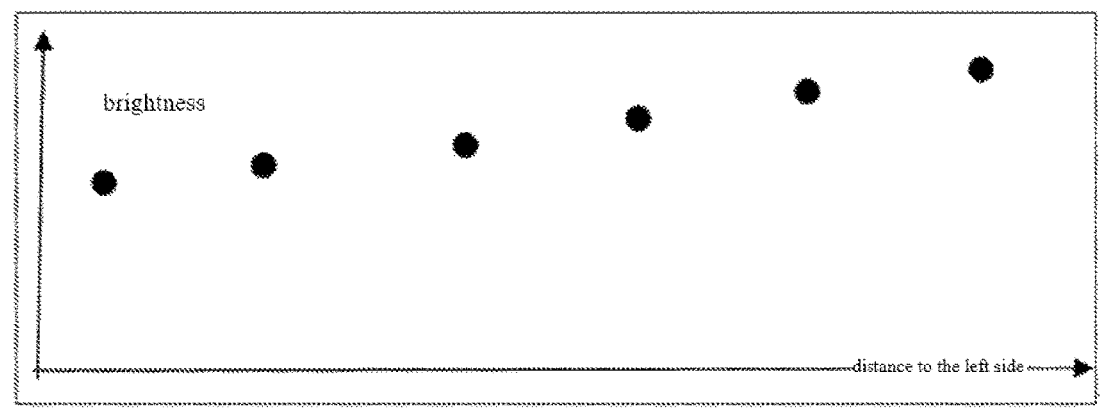
FIG. 9b is a schematic diagram of a mean brightness value curve of according to an embodiment of the present disclosure.

After splitting and obtaining the multiple sub-images, the mean brightness value of all pixels in each sub-image is calculated, and based on this mean brightness value, the mean brightness value curve shown in FIG. 9b is obtained. Then, discrete derivative processing is performed on the mean brightness value curve to obtain minimum and maximum values of the discrete derivatives, and based on these minimum and maximum values, the information of the bending region existing in the appearance of the object to be detected can be obtained. The discrete derivative processing may be, for example, to perform subtraction on the previous and subsequent values on the mean brightness value curve.

The above provides a detailed explanation of how to obtain different defects, i.e., fracture marks, pits, large rough regions, and bends, in the appearance of the object to be detected. It should be noted that, in specific implementation, with respect to the image of the object to be detected, the electronic device may simultaneously detect the above defects; alternatively, it may sequentially detect each defect, and when the previous defect is within an allowable range of quality, the next defect detection is performed, otherwise, the defect detection processing will be ended directly and a prompt message indicating that the detected object has quality problems will be output.

For example, in specific implementation, the pit in the appearance of the object to be detected may be detect first; when there is not a pit or the area of the pit is less than a first preset area threshold, it is detected whether there is a large rough region in the appearance of the object to be detected; when the area of the large rough region is less than a second preset area threshold, it is detected whether there is a bending region in the appearance of the object to be detected; when the bending region is less than a third preset area threshold, it is detected whether there is a fracture mark in the appearance of the object to be detected.

In sum, the method of this embodiment comprises the steps of: acquiring an image of an object to be detected; acquiring brightness information of pixels in the image; and acquiring appearance defect information of the object to be detected based on the brightness information. This method enables the electronic device to quickly and accurately obtain the appearance defect information of the object to be detected, thereby saving human labor and improving the user experience.

Apparatus Embodiment

Figure 10:
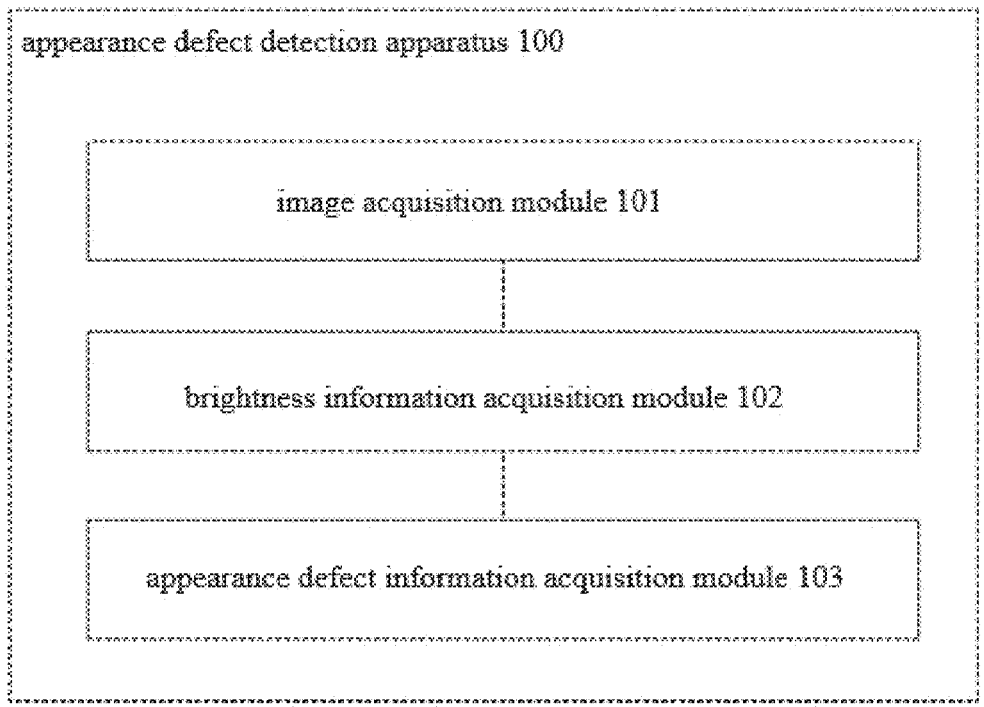
FIG. 10 is a schematic diagram of the structure of a defect detection apparatus according to an embodiment of the present disclosure.

Corresponding to the above method embodiments, in this embodiment, a defect detection apparatus is also provided, as shown in FIG. 10. The device 100 may comprise an image acquisition module 101, a brightness information acquisition module 102, and an appearance defect information acquisition module 103.

The image acquisition module 101 is used to acquire an image of the object to be detected.

The brightness information acquisition module 102 is used to acquire the brightness information of pixels in the image.

The appearance defect information acquisition module 103 is used to acquire the appearance defect information of the object to be detected based on the brightness information. The appearance defect information represents the defects existing in the appearance of the object to be detected.

In an embodiment, when acquiring appearance defect information of the object to be detected based on the brightness information, the appearance defect information acquisition module 103 may be for: splitting the image along a vertical direction to obtain multiple sub-images; acquiring first brightness information corresponding to a first sub-image based on the brightness information, wherein the first sub-image is any one of the multiple sub-images; based on the first brightness information, performing brightness vertical integration projection processing on pixels in the first sub-image to obtain a first vertical integration projection curve corresponding to the first sub-image; obtaining first fracture mark information according to the first vertical integral projection curve, wherein the first fracture mark information includes position information of a fracture mark existing in a first region, and the first region is a region corresponding to the first sub-image in the appearance of the object to be detected; and obtaining the appearance defect information based on the first fracture mark information.

In this embodiment, when obtaining first fracture mark information according to the first vertical integral projection curve, the appearance defect information acquisition module 103 may be for: performing first-order derivative processing on the first vertical integration projection curve to obtain a first target curve; splitting the first target curve at a preset interval to obtain multiple sub-target curves; acquiring multiple numerical pairs corresponding to the multiple sub-target curves one by one, wherein the numerical pair is composed of minimum and maximum values on a corresponding sub-target curve; and obtaining the first fracture mark information based on the multiple numerical pairs.

In this embodiment, when obtaining the first fracture mark information based on the multiple numerical pairs, the appearance defect information acquisition module 103 may be for: acquiring a first numerical pair, wherein the first numerical pair is any one of the multiple numerical pairs; acquiring a first minimum value and a first maximum value in the first numerical pair; and when the first minimum value is less than a first preset threshold and the first maximum value is greater than a second preset threshold, taking position information of the first numerical pair in a corresponding region of the object to be detected as the first fracture mark information.

In an embodiment, when acquiring appearance defect information of the object to be detected based on the brightness information, the appearance defect information acquisition module 103 may be for: based on the brightness information, using a first preset local threshold segmentation algorithm to obtain a first bright spot region set and a first dark spot region set in the image, wherein the first bright spot region set includes at least one bright spot region, and the first dark spot region set includes at least one dark spot region; obtaining multiple region pairs according to the first bright spot region set and the first dark spot region set, wherein the region pair is composed of any bright spot region in the first bright spot region set and any dark spot region in the first dark spot region set; obtaining pit information in the appearance of the object to be detected according to the multiple region pairs, wherein the pit information includes position information of a pit existing in the appearance of the object to be detected; and obtaining the appearance defect information based on the pit information.

In this embodiment, when obtaining pit information in the appearance of the object to be detected according to the multiple region pairs, the appearance defect information acquisition module 103 may be for: calculating a distance between the bright spot region and the dark spot region included in each region pair of the multiple region pairs; selecting the region pairs with a corresponding distance less than a preset distance threshold from the multiple region pairs to obtain multiple region pairs to be determined; calculating a mean brightness difference between the bright spot region and the dark spot region included in each region pair of the multiple region pairs to be determined; obtaining a target region pair based on the mean brightness difference; and obtaining the pit information based on the target region pair.

In this embodiment, the apparatus may further comprises a filtering module for: filtering out bright spot regions having an area less than or equal to the first preset area threshold from the first bright spot region set; and filtering out dark spot regions having an area less than or equal to a second preset area threshold from the first dark spot region set.

In an embodiment, when acquiring appearance defect information of the object to be detected based on the brightness information, the appearance defect information acquisition module 103 may be for: splitting the image along a horizontal direction to obtain multiple sub-images; obtaining a mean brightness value curve based on the brightness information and the multiple sub-images, wherein the mean brightness value curve includes multiple mean brightness value points, and the mean brightness value point represents a mean brightness value of pixels in a corresponding sub-image; performing discrete derivative processing on the mean brightness value curve to obtain minimum and maximum values of discrete derivatives; and when the minimum value is greater than a third preset threshold and the maximum value is less than a fourth preset threshold, obtaining bending region information based on the mean brightness value point corresponding to the minimum value and the maximum value, wherein the bending region information includes the position information of the bending region in the appearance of the object to be detected.

Device Embodiment

Figure 11:
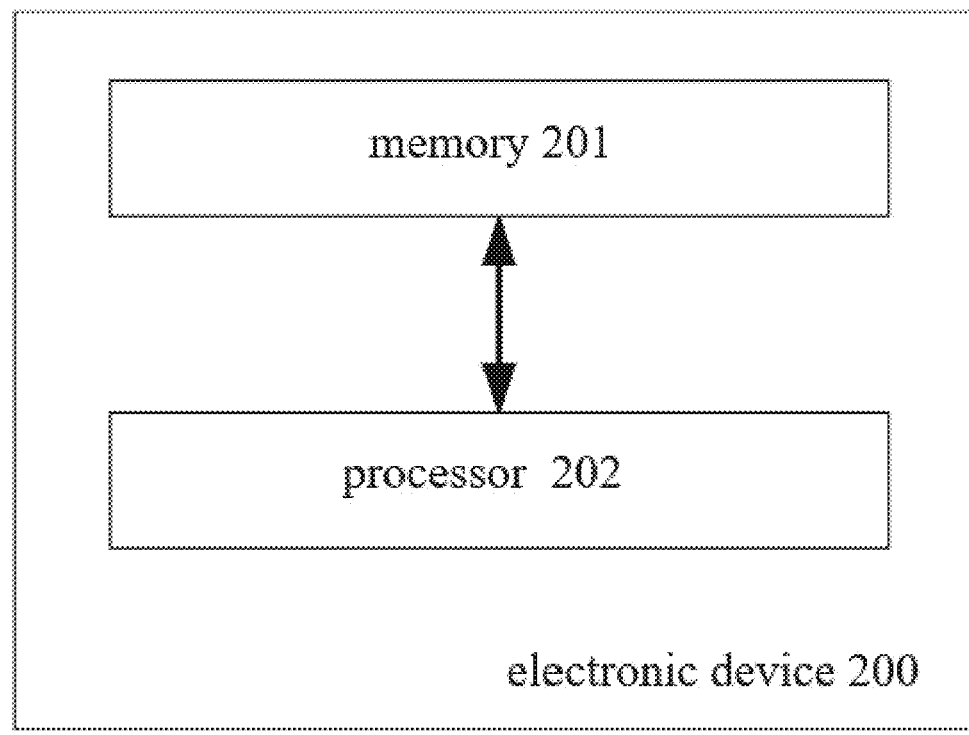
FIG. 11 is a schematic block diagram of an electronic device according to an embodiment of the present disclosure.

In this embodiment, an electronic device is also provided. As shown in FIG. 11, the electronic device 200 may further comprises a processor 201 and a memory 202. The memory 202 is for storing executable instructions. The processor 202 is for, according to the instructions, controlling the electronic device to perform the defect detection methods according to any embodiment of the present disclosure.

The present disclosure may be a system, method, and/or computer program product. The computer program product may include a computer-readable storage medium loaded with computer-readable program instructions for enabling the processor to implement various aspects of the present disclosure.

The computer-readable storage medium may be a tangible device capable of holding and storing instructions used by the instruction executing device. The computer-readable storage medium may be, but not limited to, for example, electrical storage devices, magnetic storage devices, optical storage devices, electromagnetic storage devices, semiconductor storage devices or any random appropriate combinations thereof. More specific but non-exhaustive examples of the computer-readable storage medium include: portable computer disk, hard disk, random-access memory (RAM), read-only memory (ROM), erasable programmable read-only memory (EPROM or flash), static random access memory (SRAM), portable compact disk read-only memory (CD-ROM), digital versatile disk (DVD), memory stick, floppy disk, mechanical coding device, such as a punched card storing instructions or an emboss within a groove, and any suitable combinations thereof. The computer-readable storage medium used herein is not interpreted as a transient signal itself such as radio wave or other freely propagated electromagnetic wave, electromagnetic wave propagated through waveguide or other transmission medium (such as optical pulses passing through fiber-optic cables), or electric signals transmitted through electric wires.

The computer-readable program instructions described herein may be downloaded from the computer-readable storage medium to various computing/processing devices, or to external computers or external storage devices via a network such as the Internet, local area network, wide area network and/or wireless network. The network may comprise copper transmission cables, optical fiber transmission, wireless transmission, routers, firewalls, switches, gateway computers and/or edge servers. The network adapter or network interface in each computing/processing device receives computer-readable program instructions from the network, and forwards the computer-readable program instructions for storage in the computer-readable storage medium of each computing/processing device.

The computer program instructions for executing the operations of the present disclosure may be assembly instructions, instructions of instruction set architecture (ISA), machine instructions, machine-related instructions, microcodes, firmware instructions, state setting data, or a source code or target code written by any combinations of one or more programming languages. the programming languages include object-oriented programming languages, such as Smalltalk, C++, and conventional procedural programming languages, such as "C" language or similar programming languages. The computer-readable program instructions may be completely or partially executed on the user computer, or executed as an independent software package, or executed partially on the user computer and partially on the remote computer, or completely executed on the remote computer or the server. In the case where a remote computer is involved, the remote computer may be connected to the user computer by any type of networks, including local area network (LAN) or wide area network (WAN), or connected to an external computer (such as via the Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit may execute computer-readable program instructions to implement various aspects of the present disclosure.

Various aspects of the present disclosure are described herein with reference to the flow chart and/or block diagram of the method, device (system) and computer program product according to the embodiments of the present disclosure. It should be understood that each block in the flow chart and/or block diagram and any combinations of various blocks thereof may be implemented by the computer-readable program instructions.

The computer-readable program instructions may be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram. The computer-readable program instructions may also be stored in the computer-readable storage medium. These instructions enable the computer, the programmable data processing device and/or other devices to operate in a particular way, such that the computer-readable medium storing instructions may comprise a manufactured article that includes instructions for implementing various aspects of the functions/actions specified in one or more blocks of the flow chart and/or block diagram.

The computer-readable program instructions may also be loaded into computers, other programmable data processing devices or other devices, so as to execute a series of operational steps on the computers, other programmable data processing devices or other devices to generate a computer implemented process. Therefore, the instructions executed on the computers, other programmable data processing devices or other devices may realize the functions/actions specified in one or more blocks of the flow chart and/or block diagram.

The accompanying flow chart and block diagram present possible architecture, functions and operations realized by the system, method and computer program product according to the embodiments of the present disclosure. At this point, each block in the flow chart or block diagram can represent a module, a program segment, or a portion of the instruction. The module, the program segment or the portion of the instruction includes one or more executable instructions for implementing specified logic functions. In some alternative implementations, the function indicated in the block can also occur in an order different from the one represented in the drawings. For example, two consecutive blocks actually can be executed in parallel, and sometimes they may also be executed in a reverse order depending on the involved functions. It should also be noted that each block in the block diagram and/or flow chart, and any combinations of the blocks thereof can be implemented by a dedicated hardware based system for implementing specified functions or actions, or a combination of the dedicated hardware and the computer instructions. It is well known to those skilled in the art that implementation by hardware, implementation by software, and implementation by a combination of software and hardware are all equivalent.

The embodiments of the present disclosure have been described above in an illustrative and non-exhaustive manner. The present disclosure is not limited to the embodiments disclosed herein. Various modifications and changes will be apparent to those skilled in the art without departing from the scope of the embodiments. The choice of terms used herein is intended to best explain the principles, practical applications, or technical improvements of the embodiments, or to enable other skilled persons in the art to understand the embodiments disclosed herein. The scope of the present disclosure is defined by the appended claims.

The following detailed description is merely exemplary in nature and is not intended to limit the invention or the application and uses of the invention. Furthermore, there is no intention to be bound by any theory presented in the preceding background of the invention or the following detailed description.

What is claimed is:

1. A defect detection method, comprising the steps of:
acquiring an image of an object to be detected;
acquiring brightness information of pixels in the image; and
acquiring appearance defect information of the object to be detected based on the brightness information, wherein the appearance defect information represents defects existing in an appearance of the object to be detected,
wherein the step of acquiring appearance defect information of the object to be detected based on the brightness information comprises the steps of: obtaining a mean brightness value of all pixels in the image based on the brightness information; when the mean brightness value is greater than a first brightness threshold or less than a second brightness threshold, it is determined that the appearance defect information represents the presence of serious appearance defects, otherwise it is determined that the appearance defect information represents the absence of serious appearance defects,
when there are not serious defects in the appearance of the object to be detected, detecting whether there exists fracture marks, large rough regions, pits, and bends in the appearance of the object to be detected,
wherein when detecting whether there exists pits in the appearance of the object to be detected, the step of acquiring appearance defect information of the object to be detected based on the brightness information comprises the steps of:

based on the brightness information, using a first preset local threshold segmentation algorithm to obtain a first bright spot region set and a first dark spot region set in the image, wherein the first bright spot region set includes at least one bright spot region, and the first dark spot region set includes at least one dark spot region;

obtaining multiple region pairs according to the first bright spot region set and the first dark spot region set, wherein the region pair is composed of any bright spot region in the first bright spot region set and any dark spot region in the first dark spot region set;

obtaining pit information in the appearance of the object to be detected according to the multiple region pairs, wherein the pit information includes position information of a pit existing in the appearance of the object to be detected; and obtaining the appearance defect information based on the pit information, wherein the step of obtaining pit information in the appearance of the object to be detected according to the multiple region pairs comprises the steps of:

calculating a distance between the bright spot region and the dark spot region included in each region pair of the multiple region pairs;

selecting the region pairs with a corresponding distance less than a preset distance threshold from the multiple region pairs to obtain multiple region pairs to be determined;

calculating a mean brightness difference between the bright spot region and the dark spot region included in each region pair of the multiple region pairs to be determined;

obtaining a target region pair based on the mean brightness difference; and obtaining the pit information based on the target region pair.

2. The method according to claim 1, wherein the step of acquiring appearance defect information of the object to be detected based on the brightness information comprises the steps of:

splitting the image along a vertical direction to obtain multiple sub-images;

acquiring first brightness information corresponding to a first sub-image based on the brightness information, wherein the first sub-image is any one of the multiple sub-images;

based on the first brightness information, performing brightness vertical integration projection processing on pixels in the first sub-image to obtain a first vertical integration projection curve corresponding to the first sub-image;

obtaining first fracture mark information according to the first vertical integral projection curve, wherein the first fracture mark information includes position information of a fracture mark existing in a first region, and the first region is a region corresponding to the first sub-image in the appearance of the object to be detected; and obtaining the appearance defect information based on the first fracture mark information.

3. The method according to claim 2, wherein the step of obtaining first fracture mark information according to the first vertical integral projection curve comprises the steps of:

performing first-order derivative processing on the first vertical integration projection curve to obtain a first target curve;

splitting the first target curve at a preset interval to obtain multiple sub-target curves;

acquiring multiple numerical pairs corresponding to the multiple sub-target curves one by one, wherein the numerical pair is composed of minimum and maximum values on a corresponding sub-target curve; and obtaining the first fracture mark information based on the multiple numerical pairs.

4. The method according to claim 3, wherein the step of obtaining the first fracture mark information based on the multiple numerical pairs comprises the steps of:

acquiring a first numerical pair, wherein the first numerical pair is any one of the multiple numerical pairs;

acquiring a first minimum value and a first maximum value in the first numerical pair; and when the first minimum value is less than a first preset threshold and the first maximum value is greater than a second preset threshold, taking position information of the first numerical pair in a corresponding region of the object to be detected as the first fracture mark information.

5. An electronic device comprising:
a memory for storing executable instructions; and
a processor for, according to the instructions, controlling the electronic device to perform the method according to claim 4.

6. An electronic device comprising:
a memory for storing executable instructions; and
a processor for, according to the instructions, controlling the electronic device to perform the method according to claim 3.

7. An electronic device comprising:
a memory for storing executable instructions; and
a processor for, according to the instructions, controlling the electronic device to perform the method according to claim 2.

8. According to the method of claim 1, before performing the step of obtaining multiple region pairs according to the first bright spot region set and the first dark spot region set, the method further comprises the steps of:

filtering out bright spot regions having an area less than or equal to a first preset area threshold from the first bright spot region set; and filtering out dark spot regions having an area less than or equal to a second preset area threshold from the first dark spot region set.

9. An electronic device comprising:
a memory for storing executable instructions; and
a processor for, according to the instructions, controlling the electronic device to perform the method according to claim 8.

10. The method according to claim 1, wherein the step of acquiring appearance defect information of the object to be detected based on the brightness information comprises the steps of:

splitting the image along a horizontal direction to obtain multiple sub-images;

obtaining a mean brightness value curve based on the brightness information and the multiple sub-images, wherein the mean brightness value curve includes multiple mean brightness value points, and the mean brightness value point represents a mean brightness value of pixels in a corresponding sub-image;

performing discrete derivative processing on the mean brightness value curve to obtain minimum and maximum values of discrete derivatives; and when the minimum value is greater than a third preset threshold and the maximum value is less than a fourth preset threshold, obtaining bending region information based on the mean brightness value point corresponding to the minimum value and the maximum value, wherein the bending region information includes the position information of the bending region in the appearance of the object to be detected.

11. An electronic device comprising:
a memory for storing executable instructions; and
a processor for, according to the instructions, controlling the electronic device to perform the method according to claim 10.

12. An electronic device comprising:
a memory for storing executable instructions; and
a processor for, according to the instructions, controlling the electronic device to perform the method according to claim 1.

13. An appearance defect detection apparatus, comprising:
an image acquisition module for acquiring an image of an object to be detected;
a brightness information acquisition module for acquiring brightness information of pixels in the image; and
an appearance defect information acquisition module for acquiring appearance defect information of the object to be detected based on the brightness information, wherein the appearance defect information represents defects existing in an appearance of the object to be detected,
wherein the appearance defect information acquisition module is specifically used to obtain a mean brightness value of all pixels in the image based on the brightness information when obtaining the appearance defect information of the object to be tested based on the brightness information; when the mean brightness value is greater than a first brightness threshold or less than a second brightness threshold, it is determined that the appearance defect information represents the presence of serious appearance defects, otherwise it is determined that the appearance defect information represents the absence of serious appearance defects,
when there are not serious appearance defects in the image to be detected, detecting whether there exists fracture marks, large rough regions, pits, and bends in the appearance of the object to be detected,
wherein when detecting whether there exists pits in the appearance of the object to be detected, the appearance defect information acquisition module is used for using a first preset local threshold segmentation algorithm to obtain a first bright spot region set and a first dark spot region set in the image based on the brightness information, wherein the first bright spot region set includes at least one bright spot region, and the first dark spot region set includes at least one dark spot region;
obtaining multiple region pairs according to the first bright spot region set and the first dark spot region set, wherein the region pair is composed of any bright spot region in the first bright spot region set and any dark spot region in the first dark spot region set;
obtaining pit information in the appearance of the object to be detected according to the multiple region pairs, wherein the pit information includes position information of a pit existing in the appearance of the object to be detected; and
obtaining the appearance defect information based on the pit information,
wherein when the appearance defect information acquisition module obtains pit information in the appearance of the object to be detected according to the multiple region pairs, it is used for
calculating a distance between the bright spot region and the dark spot region included in each region pair of the multiple region pairs; selecting the region pairs with a corresponding distance less than a preset distance threshold from the multiple region pairs to obtain multiple region pairs to be determined; calculating a mean brightness difference between the bright spot region and the dark spot region included in each region pair of the multiple region pairs to be determined; obtaining a target region pair based on the mean brightness difference; and obtaining the pit information based on the target region pair.

14. An electronic device, comprising the apparatus according to claim 13.

* * * * *